(12) United States Patent
Segura et al.

(10) Patent No.: US 10,427,289 B2
(45) Date of Patent: Oct. 1, 2019

(54) MULTI-POSITION UTILITY HOOK ASSEMBLY FOR A TOOL

(71) Applicant: Illinois Tool Works Inc., Glenview, IL (US)

(72) Inventors: Ricardo Segura, Lake in the Hills, IL (US); Ryan L. Francis, Palatine, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/383,157

(22) Filed: Dec. 19, 2016

(65) Prior Publication Data

US 2017/0100835 A1    Apr. 13, 2017

Related U.S. Application Data

(63) Continuation of application No. 13/108,914, filed on May 16, 2011, now Pat. No. 9,522,464.

(51) Int. Cl.
| | |
|---|---|
| *B25H 3/00* | (2006.01) |
| *B25C 7/00* | (2006.01) |
| *B25F 5/02* | (2006.01) |
| *F16M 13/02* | (2006.01) |

(52) U.S. Cl.
CPC .............. *B25H 3/006* (2013.01); *B25C 7/00* (2013.01); *B25F 5/02* (2013.01); *F16M 13/022* (2013.01)

(58) Field of Classification Search
CPC .. B25H 3/006; B25H 3/00; B25F 5/02; B25C 7/00; A45F 5/021; A45F 2200/0575; Y10S 224/904

USPC ......................... 224/268–269, 255, 904, 271; 248/225.21; 24/374, 600.6, 598.5, 589.6; 173/171
See application file for complete search history.

(56) References Cited

U.S. PATENT DOCUMENTS

| | | | | |
|---|---|---|---|---|
| 3,286,315 | A | * 11/1966 | Price ................... | A01K 27/005 24/374 |
| 3,478,550 | A | 11/1969 | Salvesen | |
| 4,406,064 | A | 9/1983 | Goss | |
| 4,483,473 | A | 11/1984 | Wagdy | |
| 4,522,162 | A | 6/1985 | Nikolich | |
| 4,787,145 | A | 11/1988 | Klicker et al. | |
| 5,265,312 | A | 11/1993 | Okumura | |

(Continued)

FOREIGN PATENT DOCUMENTS

| | | |
|---|---|---|
| DE | 102004032788 | 2/2006 |
| EP | 1 231 028 | 8/2002 |

(Continued)

OTHER PUBLICATIONS

International Search Report and Written Opinion for International Application No. PCT/US2012/037927, dated Oct. 15, 2012 (15 pages).

(Continued)

*Primary Examiner* — Scott T McNurlen
(74) *Attorney, Agent, or Firm* — Neal, Gerber & Eisenberg LLP

(57) ABSTRACT

A multi-position hook assembly for use in a tool that includes a hook having a first leg and a second leg joined by a top span member, and a mounting member configured for slidably receiving the top span member and releasably locking the hook in a plurality of positions.

17 Claims, 7 Drawing Sheets

(56) References Cited

U.S. PATENT DOCUMENTS

| | | | |
|---|---|---|---|
| 6,145,724 A | 11/2000 | Shkolnikov et al. | |
| 6,321,622 B1 | 11/2001 | Tsuge | |
| 6,612,476 B2 | 9/2003 | Smolinski | |
| 6,679,414 B2 | 1/2004 | Rotharmel | |
| 7,127,971 B1 | 10/2006 | Braun | |
| 7,222,767 B1 * | 5/2007 | Yang | A45F 5/021 173/170 |
| 7,306,052 B2 | 12/2007 | Vahabi-Nejad et al. | |
| 7,455,001 B1 | 11/2008 | Waters | |
| 8,087,556 B2 | 1/2012 | Oomori et al. | |
| 8,308,034 B2 | 11/2012 | Shibata et al. | |
| 8,407,862 B2 | 4/2013 | Bluma | |
| 2002/0117531 A1 | 8/2002 | Schell et al. | |
| 2003/0132264 A1 | 7/2003 | Smolinski | |
| 2005/0015935 A1 | 1/2005 | Bader et al. | |
| 2005/0133552 A1 * | 6/2005 | Lawrence | A45F 5/02 224/269 |
| 2006/0091168 A1 | 5/2006 | Ng | |
| 2008/0185410 A1 | 8/2008 | Oomori et al. | |
| 2009/0025515 A1 * | 1/2009 | Shibata | B25F 5/02 81/57.4 |
| 2009/0278012 A1 | 11/2009 | Okouchi et al. | |
| 2011/0108300 A1 | 5/2011 | Nagasaka et al. | |
| 2012/0023716 A1 | 2/2012 | Bluma | |
| 2015/0040408 A1 | 2/2015 | Francis et al. | |
| 2015/0173498 A1 | 6/2015 | Wang et al. | |
| 2015/0290791 A1 | 10/2015 | Takahashi et al. | |

FOREIGN PATENT DOCUMENTS

| | | |
|---|---|---|
| EP | 1 327 500 | 7/2003 |
| EP | 2 022 607 | 2/2009 |
| EP | 2 308 652 | 4/2011 |
| JP | 2006116685 | 5/2006 |
| JP | 2006181709 | 7/2006 |
| JP | 2009028841 | 2/2009 |
| JP | 2010046739 | 3/2010 |
| WO | WO 2016/177795 | 11/2016 |

OTHER PUBLICATIONS

International Preliminary Report on Patentability for International Application No. PCT/US2012/037927, dated Nov. 19, 2013 (9 pages).

* cited by examiner

MULTI-POSITION UTILITY HOOK ASSEMBLY FOR A TOOL

PRIORITY CLAIM

This patent application is a continuation of, and claims priority to and the benefit of, U.S. patent application Ser. No. 13/108,914, which was filed on May 16, 2011, the entire contents of which are incorporated herein by reference.

BACKGROUND

The present disclosure relates to power tools, such as powered fastener drivers, saws, drills, and other hand-held power tools typically used on construction sites, in factories, shops or other locations. More specifically, the present disclosure relates to a hook assembly for such tools.

In the construction industry, tradesmen frequently use power tools in a variety of locations. Often, it is necessary to have the tool operator's hands free for another task in places where there is no convenient surface on which to place the tool. Carpenters, for example, while using a power nailer or powered fastener-driving tool to frame a building, may need to correctly position the next stud or joist before nailing it into place. While working on roof joists, rafters or on ladders, the ability to secure the tool in a convenient location, such as a rafter or a user's belt, facilitates the performance of those tasks. Tradesmen will also save time and money by keeping their tools close by and within reach.

Hook assemblies for power tools have been disclosed in the prior art, such as U.S. Pat. No. 4,406,064 to Goss. This reference teaches a hook that is secured to the tool handle and housing through the holes that mount the handle to the housing. To stabilize the tool, the hanger extends along and covers a portion of the handle. In some tools, it is disadvantageous to cover a portion of the handle with the hanger. Also, power tools vary considerably in their shape, the position of the handle and the distribution of the tool's weight.

Mounting of a hook on the top of a tool near the handle also may result in decreased visibility for the user. Many tools are designed to have the user look over the tool to the workpiece in order to direct its movement. In most cases, this requires looking past or near the handle of the tool. When deployed in a position to hold the tool, conventional hooks often obscure the user's field of vision. Although the prior art devices are adjustable to a position close to the body of the tool, it is inconvenient to keep moving the hook from one position to another each time the tool is used, then set aside.

Additionally, known hook assemblies for such power tools typically have only two positions, one when the hook is in use, and a second for stowing the hook out of the way while the tool is operated. In some circumstances, neither of these is a good option. In situations when the operator desires to place the tool on his belt, the position of the hook is not suitable for belt support.

There is a need for an improved hook assembly for a power tool that addresses the above-listed issues of conventional tools.

SUMMARY

Various embodiments of the present disclosure provide an improved multi-position hook assembly for a tool that mounts directly to the tool housing. The hook assembly enables the user to hang the power tool from either side of the tool in a variety of locations, including on fixed structures such as ladders or rafters, as well as on a user's belt. In addition, the hook assembly is movable laterally relative to each side of the tool to accommodate left and right-handed users.

More specifically, the multi-position hook assembly for use in a tool includes a hook having a first leg and a second leg joined by a top span member, and a mounting member configured for slidably receiving the top span member and releasably locking the hook in a plurality of positions.

In an embodiment, a multi-position hook assembly for use in a tool is provided that includes a hook having a first leg extending from a first side of the hook and a second leg extending from an opposing, second side of the hook. The first and second legs of the hook are joined by a top span member including a plurality of notches. A mounting member is attached to the tool and defines a channel and a receptacle, where the channel is configured to slidably receive the hook. A lock assembly is positioned in the receptacle and includes a lock button that is movable between a depressed and a non-depressed position, and a biasing member for biasing the lock button to the non-depressed position. A cover plate is mounted on the mounting member such that the top span member of the hook is positioned between the cover plate and the mounting member. In operation, the hook is slidable between a plurality of positions defined by the notches when the lock button is in the depressed position, and is secured at a designated one of the plurality of positions when the lock button is moved to the non-depressed position for engaging a respective one of the notches associated with the designated position.

DETAILED DESCRIPTION

Figure 1:
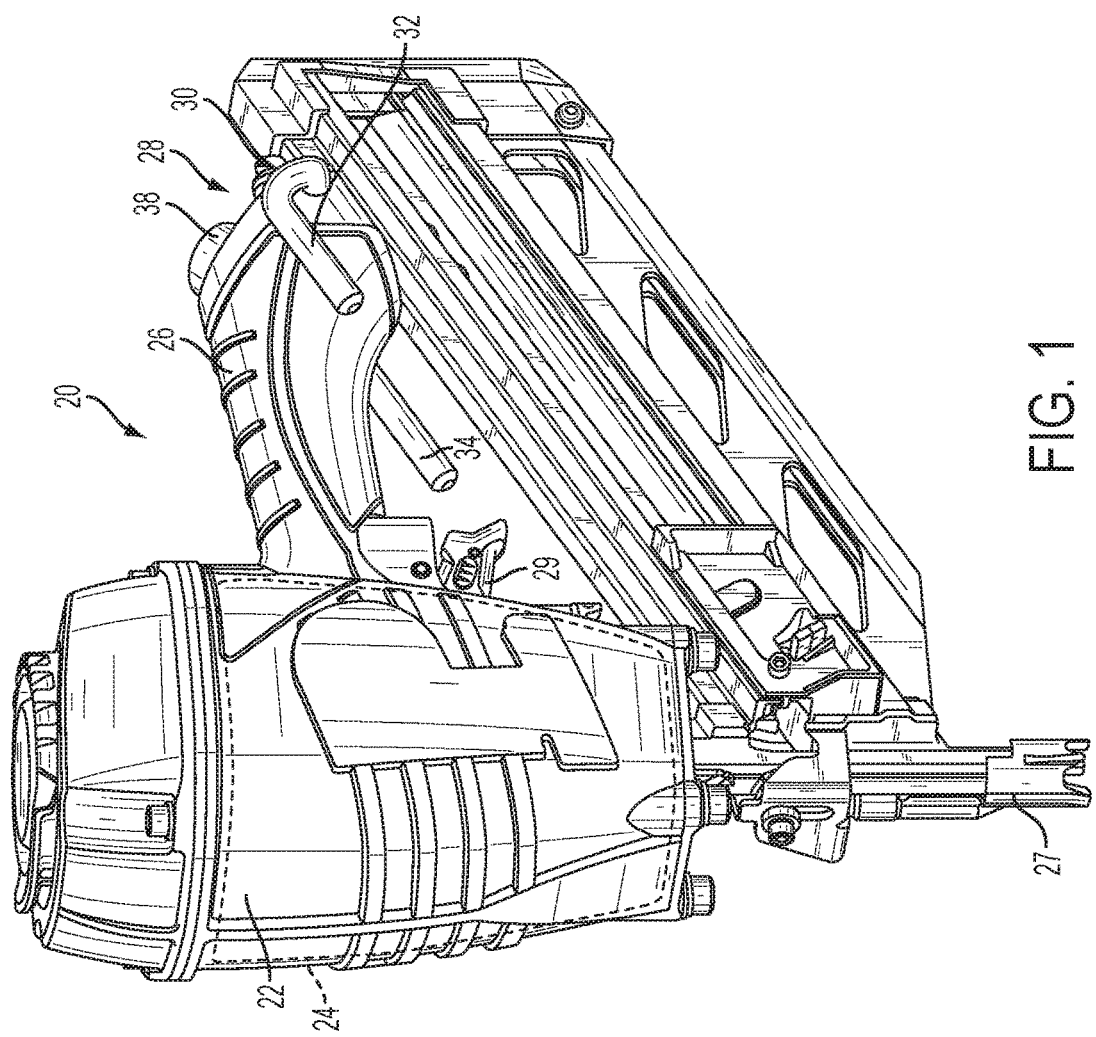
FIG. 1 is a side perspective view of a tool equipped with the multi-position hook assembly in accordance with an embodiment of the present disclosure.

Referring now to FIG. 1, a pneumatically-powered, fastener-driving tool 20 suitable for incorporating the multi-position hook assembly is shown. The tool 20 includes a main housing 22, usually the cast metal, however, other materials are contemplated. The main housing 22 encloses a power unit 24 (shown hidden). In certain embodiments, the power unit 24 is pneumatic, however, combustion-powered units are contemplated as disclosed in commonly assigned U.S. Pat. Nos. 4,483,473; 4,522,162; 6,145,724; and 6,679,414, all of which are incorporated by reference. The main housing 22 also includes a handle 26. When a workpiece contact element 27 is depressed against a workpiece and a trigger 29 is pulled, the power unit 24 causes a piston with a driver blade (not shown) to travel under pressure to drive a fastener as is well known in the art. While the tool 20 is depicted as being of one type of a fastener-driving tool, other types of fastener-driving tools, as well as other portable power tools, including but not limited to saws and drills, are contemplated as having the potential of incorporation of the multi-position hook assembly.

Figure 3:
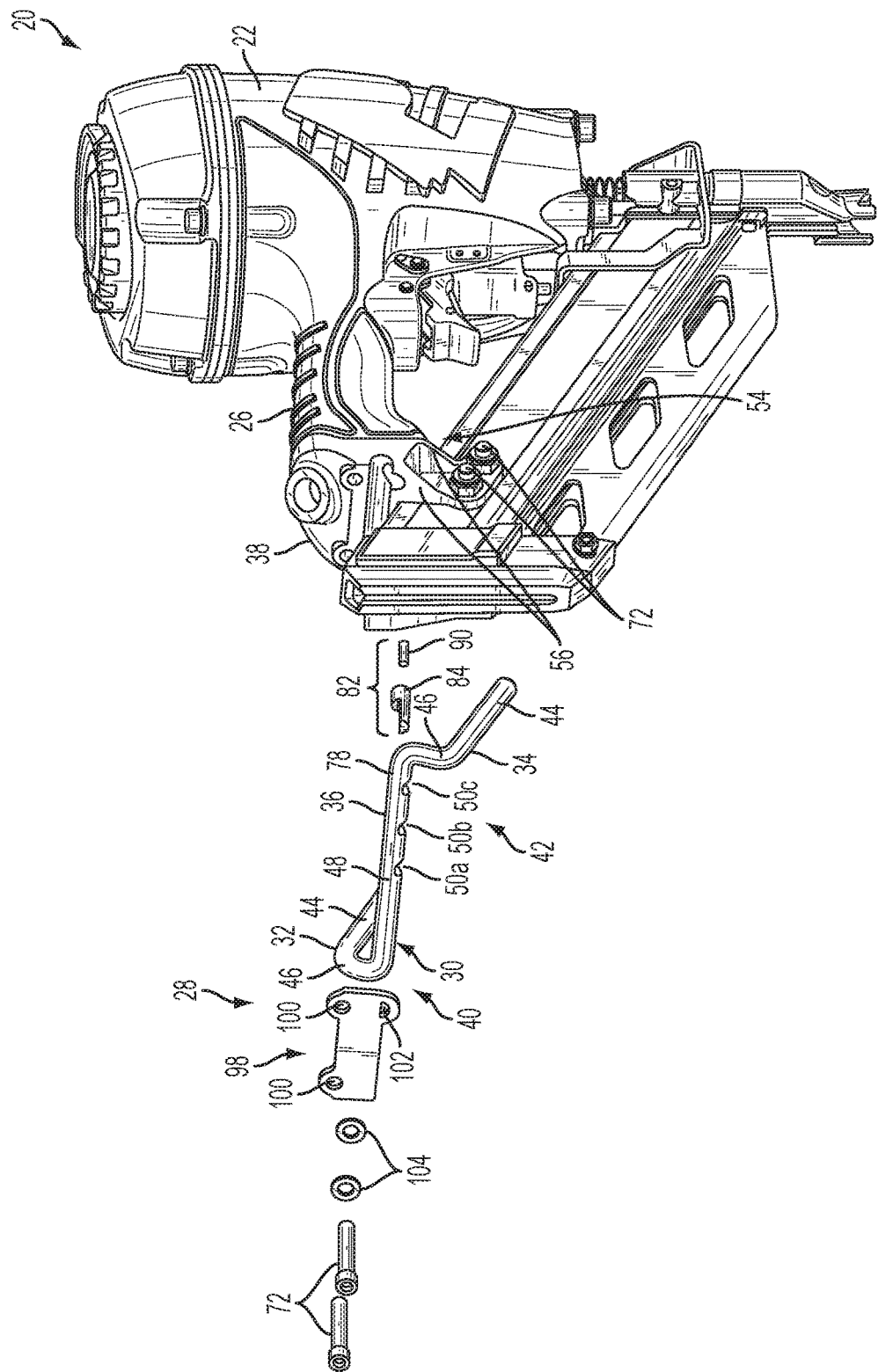
FIG. 3 is an exploded rear perspective view of the multi-position hook assembly of FIG. 1 relative to mounting member secured to the tool.
Figure 4:
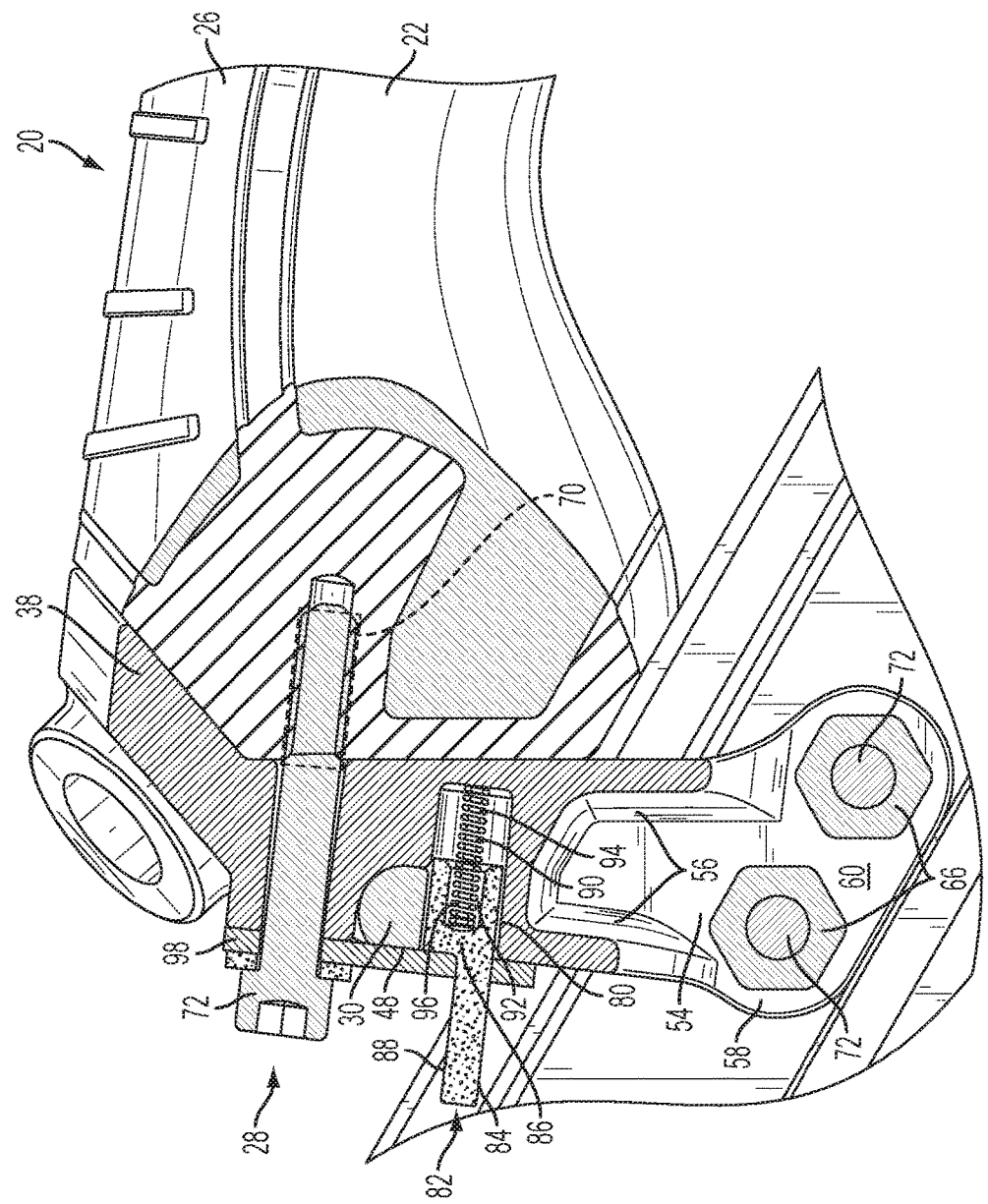
FIG. 4 is a fragmentary, vertical cross-section view of the tool and the multi-position hook assembly of FIG. 1.
Figure 5:
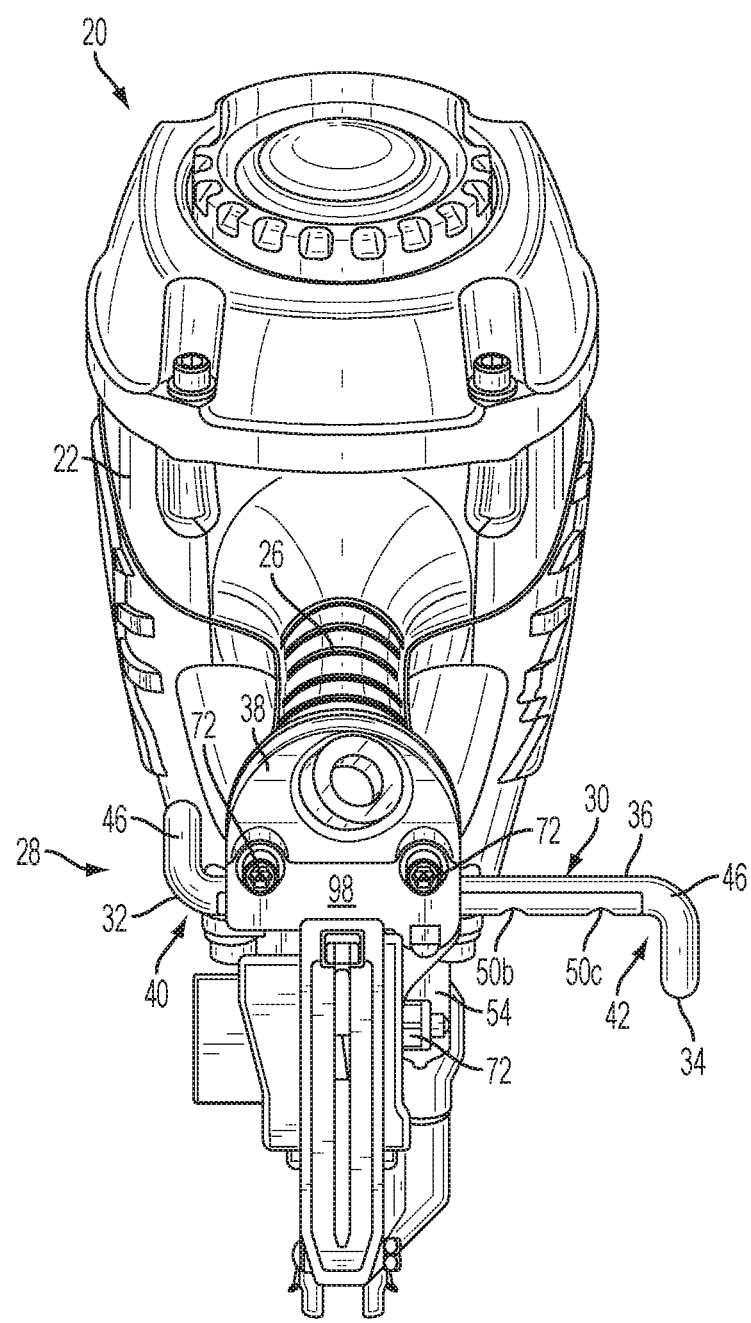
FIG. 5 is a rear perspective view of the tool and the multi-position hook assembly of FIG. 1 showing the hook assembly in a first position.

Referring now to FIGS. 1, 3 and 4, the multi-position hook assembly 28 includes a hook 30 having a first leg 32 and a second leg 34 joined and spaced apart by a top span member 36. The hook assembly 28 includes a mounting block or mounting member 38 configured for slidably receiving the top span member 36 of the hook 30 and for releasably locking the hook in more than one position.

The hook 30 is preferably constructed from a single length of formed wire. However, it should be appreciated that other materials and fabrication techniques are contemplated. As seen in FIG. 3, the first and second legs 32, 34 of the hook 30 extend from opposing ends 40 and 42 of the top span member 36. The first and second legs 32, 34 are each generally L-shaped and include a top member 44 and a side member 46 where the side member is integrally formed with a respective end 40, 42 of the top span member 36. In the preferred embodiment, the hook 30 is configured so that the first and second legs 32, 34 extend from opposing sides of the top span member 36 at 90° angles relative to the span member to allow the hook to be easily secured to a belt loop, framing member, ladder, scaffold and other similar structures from either side of the tool 20. It should be appreciated that other angles of orientation are contemplated.

As shown in FIGS. 3 and 4, the top span member 36 has a generally round or circular cross-sectional shape with one side that is machined as a flat surface 48. Three semi-circular notches 50a, 50b and 50c are formed on the top span member 36 for securing the hook 30 in different positions relative to the mounting member. It should be appreciated that the top span member 36 of the hook 30 may include one or a plurality of notches 50a, 50b and 50c.

Figure 2:
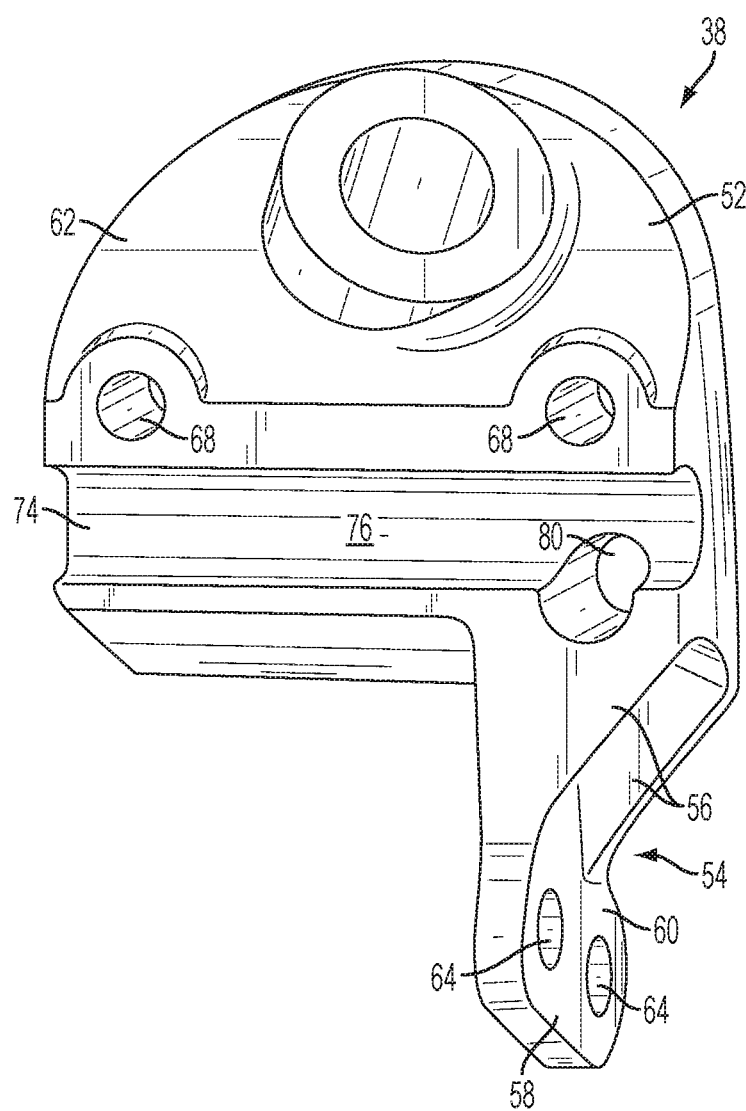
FIG. 2 is an enlarged perspective view of the mounting member of the multi-position hook assembly of FIG. 1.

Referring now to FIGS. 2 and 4, the mounting member 38 is preferably integrally formed and includes a body 52 and a mounting arm 54 extending from the body. The mounting arm 54 includes spaced triangular gusset-like supports 56 and a side mounting portion 58 having an outer surface 60 that is transverse to a front surface 62 of the body 52. The front surface 62 faces the rear of the tool 20. The side mounting portion 58 defines a pair of through-holes 64 that align with corresponding through-holes (not shown) formed in the magazine of the tool 20 and are used to mount the magazine to the tool. Similarly, the body 52 defines a pair of through-holes 68 that are aligned with threaded openings 70 on the end of the tool 20. Suitable fasteners, such as threaded bolts 72, are inserted through the through-holes 64, 68 and are threaded and secured using locknuts 66 on the magazine or in the threaded openings 70 on the tool 20 for respectively mounting the magazine and the mounting member 38 to the tool.

The body 52 of the mounting member 38 defines a semi-circular channel 74 that is configured for slidably receiving the hook 30. Specifically, the channel 74 has a rounded inner surface 76 that corresponds to a rounded exterior 78 of the hook 30. The size of the channel 74 is dimensioned to be slightly larger than a diameter of the hook 30 so that the hook freely slides laterally within the channel.

As shown in FIG. 2, a circular receptacle 80 is defined by the body 52 and is positioned at least partially in the channel 74. The receptacle 80 is configured to receive a lock assembly 82 for locking the hook 30 at a particular position relative to the mounting member 38.

Referring now to FIGS. 3 and 4, the lock assembly 82 includes a lock actuator or lock button 84 having a generally circular first end 86 and a semi-circular second end 88, and a biasing member, such as coil spring 90. The first end 86 of the lock button 84 defines an inner receptacle 92 sized to receive the coil spring 90 for securing an end of the coil spring to the lock button. A first end 94 of the coil spring 90 is positioned in the receptacle 80 on the body 52 of the mounting member 38 and an opposing second end 96 is positioned in the lock button receptacle 92 (see FIG. 4). Thus, the coil spring 90 compresses as the lock button 84 is depressed or moved to a depressed position and expands and biases the button 84 outwardly when the button is released to the default non-depressed, or locked position (FIG. 4). As further described below, the circular first end 86 of the lock button 84 is configured to matingly engage one of the notches 50a, 50b or 50c on the top span member 36 of the hook 30 for securing the hook at a particular position. When the lock button 84 is depressed, the semi-circular end 88 of the button moves into the notch 50a, 50b or 50c thereby disengaging the hook 30 from the button 84 and allowing the hook to slide laterally in the channel 74.

Referring to FIG. 3, a generally planar cover plate 98 secures the hook 30 and the lock assembly 82 in position on the mounting member 38. In addition, the cover plate 98 prevents the hook 30, the button 84 and the spring 90 from becoming separated from the mounting member 38. The cover plate 98 defines a pair of spaced mounting holes 100 on one side, and a semi-circular through-hole 102 on an opposing side. The mounting holes 100 are aligned with corresponding through-holes 68 on the body 52 of the mounting member 38 and fasteners, such as the threaded bolts 72 described above, are inserted into each of the mounting holes 100, through the through-holes 68 and into threaded openings or receptacles 70 on the tool 20 to secure the cover plate 98 on the mounting member. To further secure the fasteners in position, a lock washer 102 is respectively placed on each of the bolts 72 prior to securing the bolts to the mounting member 38 and the tool 20.

As shown in FIG. 4, the flat surface 48 of the top span member 36 is placed against the planar cover plate 98 to prevent the hook 30 from rotating within the channel 74 after assembly. This construction enables the hook 30 to remain stably in position during use. The lock button 84 is positioned slightly below the hook 30 so that the semi-circular end 88 of the lock button slidingly engages the corresponding semi-circular hole 102 on the cover plate 98. The end 88 protrudes outwardly from the cover plate 98 so that a user can easily depress the lock button 84. As described above, the round end 86 of the lock button 84 engages a corresponding one of the notches 50a, 50b or 50c on the hook 30 when the button is in the non-depressed position.

Referring now to FIGS. 3 and 5-7, in the illustrated example, the hook 30 is adjustable to three different positions for securing the tool 20 to a belt, a framing member, a ladder or other structure. In a first position shown in FIG. 5, the hook 30 is moved laterally within the channel so that the leftmost notch 50a, as viewed from the rear end of the tool 20, is aligned with and engaged by the lock button 84. The first leg 32 abuts the mounting member 38 and the second leg 34 is spaced a designated distance from the mounting member such that a framing member, such as a stud or joist, fits between the second leg and the mounting member for temporarily hanging the tool 20 from the framing member or joist. Specifically, an outer surface 78 (FIG. 3) of the hook 30 rests on an outer surface of a framing member and the second leg 34 extends along and engages a transverse side or surface of the framing member for keeping the hook assembly 28 from falling off of the framing member. To move the hook 30 to a different position, a user depresses the lock button 84, which disengages the lock button from the leftmost notch 50*a* and allows the hook 30 to move laterally within the channel 74 relative to the mounting member 38 without the use of tools.

Figure 6:
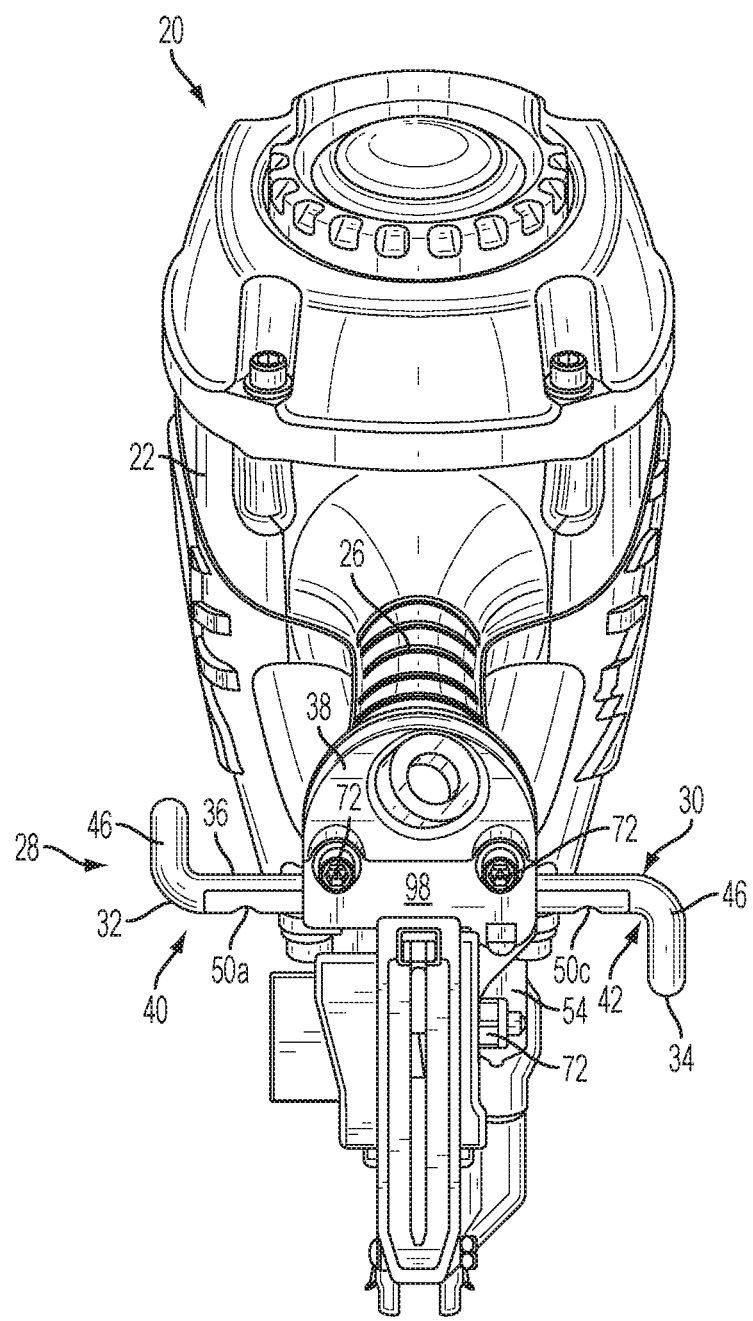
FIG. 6 is a rear perspective view of the tool and the multi-position hook assembly of FIG. 1 showing the hook assembly in a second position.

In FIG. 6, the hook 30 is in a second position where the lock button 84 is engaged with the centermost notch 50*b* on the top span member 36. In this position, the first and second legs 32 and 34 of the hook 30 are spaced an equal distance from the mounting member 38 to allow a user to insert the first or second leg respectively over their belt or upper pants edge on either the left side or the ride side of their body.

Figure 7:
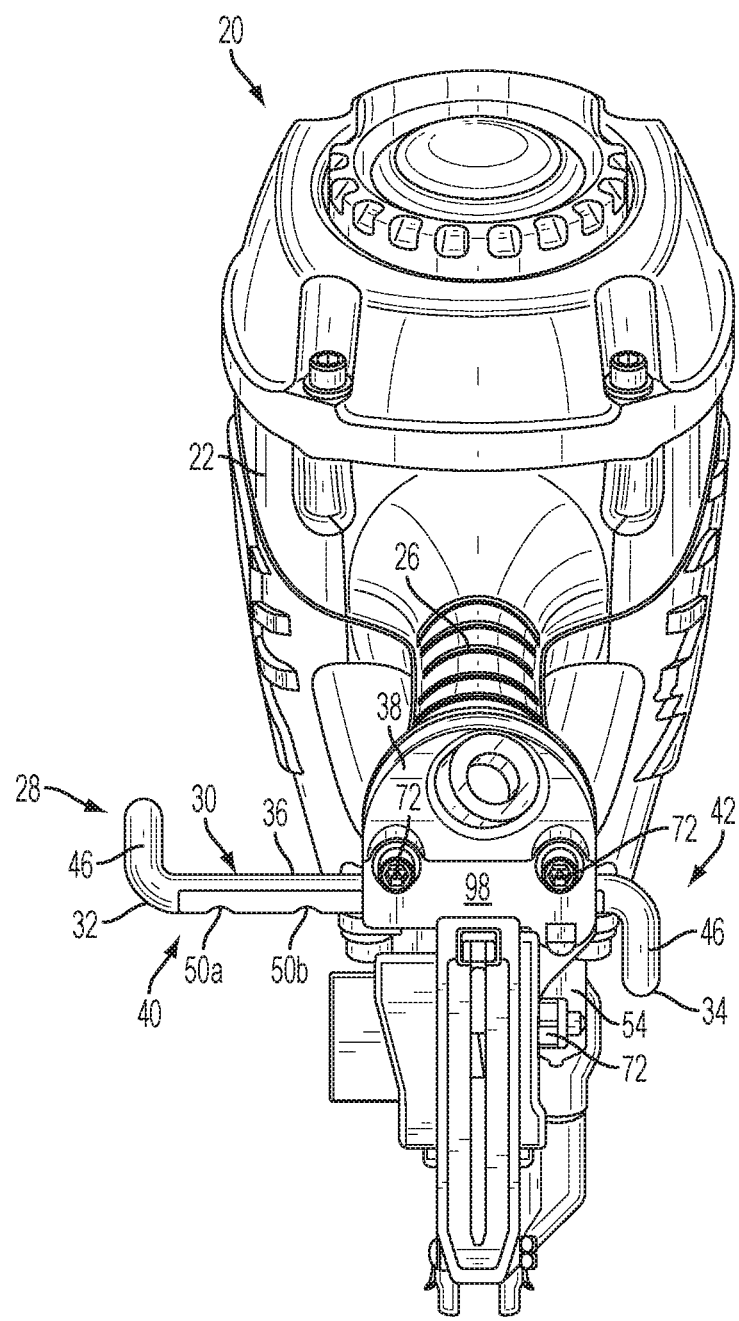
FIG. 7 is a rear perspective view of the tool and the multi-position hook assembly of FIG. 1 showing the hook assembly in a third position.

In FIG. 7, the hook 30 is moved so that the lock button 84 is engaged in the rightmost notch 50*c* on the top span member 36 as the hook assembly 28 is viewed from the rear end of the tool 20. In this position, the first leg 32 is spaced a designated distance from the mounting assembly 38 for receiving a framing member between the first leg and the mounting member. The positioning of the top span member 36 along one surface of the framing member and the top member 44 of the first leg 32 on a transverse side of the framing member enables the hook 30 to stably and securely hold the tool 20 in place on the framing member.

As described above, the hook 30 is movable between several different positions to enable a user to temporarily and selectively secure the tool 20 to a framing member, a user's belt, a ladder, a scaffold or other structure quickly and easily regardless of whether the framing member, belt or structure is on a user's right side or their left side or whether the user is right-handed or left-handed, Furthermore, the secure engagement of the lock button 84 in the notches 50*a*, 50*b* and 50*c* on the hook 30 provides a stable and safe way to temporarily secure a tool 20 on a framing member, belt or other structure on a job site.

While particular embodiments of the multi-position hook assembly for a power tool have been described herein, it will be appreciated by those skilled in the art that changes and modifications may be made thereto without departing from the invention in its broader aspects and as set forth in the following claims.

The invention claimed is:

1. A tool comprising:
a housing including a handle;
a mounting member adjacent to the handle;
a hook slidably received in a channel defined by the mounting member and movable relative to the mounting member between a first position and a second position;
a cover mounted to the mounting member defining a through-hole having a first shape;
a spring; and
a locking device movable relative to the mounting member between:
a locked position in which the locking device prevents the hook from moving from the first position to the second position; and
an unlocked position in which the locking device does not prevent the hook from moving from the first position to the second position,
wherein the locking device includes a first portion and a second portion connected to the first portion,
wherein a portion of the mounting member defines a receptacle, the portion of the mounting member configured to receive the spring and the locking device,
wherein the spring is positioned between a first end wall of the locking device and a second end wall that partially defines the portion of the mounting member,
wherein the spring is biased by the second end wall and the cover,
wherein, when the locking device is in the locked positon, the first portion engages the hook and the first portion is in a third position relative to the hook,
wherein the first portion is positioned between the cover and the spring, and
wherein the second portion: (1) enables the hook to transversely move when the locking device is in the unlocked position and the second portion is in the third position relative to the hook; (2) has the first shape of the though-hole defined in the cover; and (3) slidably extends through the through-hole.

2. The tool of claim 1, wherein the hook includes a first leg, a second leg, and a span member between the first and second legs.

3. The tool of claim 2, wherein the cover is attached to the mounting member to retain the span member in the channel.

4. The tool of claim 2, wherein the first and second legs extend from the span member on opposite sides of the handle.

5. The tool of claim 4, wherein the first leg includes a first top member and a first side member, the first side member extending from the span member and the first top member extending from the first side member, and wherein the second leg includes a second top member and a second side member, the second side member extending from the span member and the second top member extending from the second side member.

6. The tool of claim 5, wherein the first side member extends from the span member in a first direction and the second side member extends from the top span member in a second direction different from the first direction.

7. The tool of claim 6, wherein the first and second side members extend from opposite ends of the span member.

8. The tool of claim 2, wherein at least part of the span member is flat and engages a flat surface to prevent the hook from rotating relative to the mounting member.

9. The tool of claim 1, wherein the mounting member is attached to the handle.

10. The tool of claim 9, which includes a magazine that defines a fastener-receiving channel, and wherein the mounting member is also attached to the magazine.

11. The tool of claim 1, wherein the hook defines multiple notches, wherein the locking device contacts a first one of the notches when the hook is in the first position and the locking device is in the locked position, and wherein the locking device contacts a second one of the notches different from the first notch when the hook is in the second position and the locking device is in the locked position.

12. A tool comprising:
a housing including a handle;
a mounting member; and
a hook including a first leg, a second leg, and a span member between the first and second legs, the span member extending in a first direction,
wherein the hook is slidably mounted to the mounting member such that the first and second legs extend from the span member on opposite sides of the handle, wherein the first leg includes:
a first side member extending from the span member in a second direction different from the first direction; and
a first top member extending from the first side member in a third direction different from the first direction and different from the second direction, and
wherein the second leg includes:
a second side member extending from the span member in a fourth direction different from the first direction, opposite from the second direction, and different from the third direction; and
a second top member extending from the second side member in the third direction.

13. The tool of claim 12, wherein the span member is positioned within a channel, and wherein the hook is slidable relative to the mounting member between a first position and a second position.

14. The tool of claim 13, which includes a locking device movable relative to the mounting member between:

a locked position in which the locking device prevents the hook from moving from the first position to the second position; and an unlocked position in which the locking device does not prevent the hook from moving from the first position to the second position.

15. The tool of claim 14, wherein the hook defines multiple notches, wherein the locking device contacts a first one of the notches when the hook is in the first position and the locking device is in the locked position, and wherein the locking device contacts a second one of the notches different from the first notch when the hook is in the second position and the locking device is in the locked position.

16. The tool of claim 12, wherein the mounting member is attached to the handle.

17. The tool of claim 16, which includes a magazine that defines a fastener-receiving channel, and wherein the mounting member is also attached to the magazine.

\* \* \* \* \*